(12) United States Patent
Brink et al.

(10) Patent No.: US 11,065,799 B2
(45) Date of Patent: Jul. 20, 2021

(54) ADJUSTABLE VENTURI RING

(71) Applicant: BRAMPTON ENGINEERING INC., Brampton (CA)

(72) Inventors: Ralph Brink, Brampton (CA); Laura Martin, Guelph (CA); Al-Amin Aziz, Toronto (CA); Winston Lewis, Brampton (CA); Gary Hughes, Caledon (CA)

(73) Assignee: BRAMPTON ENGINEERING INC., Brampton (CA)

( * ) Notice: Subject to any disclaimer, the term of this patent is extended or adjusted under 35 U.S.C. 154(b) by 133 days.

(21) Appl. No.: 16/492,993

(22) PCT Filed: Mar. 23, 2018

(86) PCT No.: PCT/IB2018/051984
§ 371 (c)(1),
(2) Date: Sep. 11, 2019

(87) PCT Pub. No.: WO2018/185597
PCT Pub. Date: Oct. 11, 2018

(65) Prior Publication Data
US 2020/0016815 A1    Jan. 16, 2020

Related U.S. Application Data

(60) Provisional application No. 62/482,969, filed on Apr. 7, 2017.

(51) Int. Cl.
*B29C 48/92* (2019.01)
*B29C 48/32* (2019.01)
(Continued)

(52) U.S. Cl.
CPC .............. *B29C 48/32* (2019.02); *B29C 48/10* (2019.02); *B29C 48/885* (2019.02); *B29C 48/92* (2019.02);
(Continued)

(58) Field of Classification Search
CPC ....... B29C 48/32; B29C 48/885; B29C 48/92; B29C 48/10; B29C 48/913;
(Continued)

(56) References Cited

U.S. PATENT DOCUMENTS 3,507,006 A    4/1970   Princen
3,764,251 A    10/1973  Konerman
(Continued)

FOREIGN PATENT DOCUMENTS

CA    2398511 A1    2/2003
CH    432813 A      3/1967
(Continued)

OTHER PUBLICATIONS

PCT/IB2018/051984, Adjustable Venturi Ring, filed Mar. 23, 2018.
(Continued)

*Primary Examiner* — Nahida Sultana
(74) *Attorney, Agent, or Firm* — Perry + Currier Inc.

(57) ABSTRACT

An apparatus includes an upper lip positioned with respect to an air flow passage. The upper lip is to direct air flow from the air flow passage around a bubble of blown film. The apparatus further includes a Venturi ring movably mounted with respect to the upper lip and adjustable in position with respect to the upper lip. The Venturi ring is to adjustably lock the bubble of blown film.

20 Claims, 7 Drawing Sheets

(51) Int. Cl.
  *B29C 48/10* (2019.01)
  *B29C 48/885* (2019.01)
  *B29C 48/88* (2019.01)
(52) U.S. Cl.
  CPC .. *B29C 48/913* (2019.02); *B29C 2948/92619* (2019.02); *B29C 2948/92923* (2019.02)
(58) Field of Classification Search
  CPC .......... B29C 2948/92619; B29C 2948/92923; B29C 55/28; B29C 2948/926; B29C 2948/92971; B29C 2948/92142
  See application file for complete search history.

(56) References Cited

U.S. PATENT DOCUMENTS

| | | | |
|---|---|---|---|
| 4,373,273 | A | 2/1983 | Church |
| 4,826,414 | A | 5/1989 | Planeta |
| 5,804,221 | A * | 9/1998 | Planeta ................ B29C 48/913 425/72.1 |
| 9,248,601 | B2 | 2/2016 | Kulgemeyer et al. |
| 2002/0018822 | A1 | 2/2002 | Krycki |
| 2004/0032039 | A1 | 2/2004 | Krycki |
| 2014/0335213 | A1 * | 11/2014 | Zimmermann ....... B29C 48/903 425/141 |

FOREIGN PATENT DOCUMENTS

| | | |
|---|---|---|
| CN | 1218739 A | 6/1999 |
| CN | 204844843 U | 12/2015 |
| DE | 102016119872 A1 | 12/2016 |
| DE | 102015016825 A1 | 6/2017 |
| EP | 0556653 A1 | 8/1993 |
| EP | 1736297 A1 | 12/2006 |
| EP | 1719602 B1 | 9/2007 |
| JP | S601335227 A | 7/1985 |
| JP | H10272692 A | 10/1998 |
| WO | WO-2011054715 A1 | 5/2011 |
| WO | WO-2017049808 A1 | 3/2017 |

OTHER PUBLICATIONS

ISA/CA, International Search Report and Written Opinion, dated Jul. 5, 2018, re PCT International Patent Application No. PCT/IB2018/051984.

ISA/CA, International Preliminary Report on Patentability (Ch II), dated Jul. 5, 2018, re PCT International Patent Application No. PCT/IB2018/051984.

* cited by examiner

ADJUSTABLE VENTURI RING

CROSS-REFERENCE TO RELATED APPLICATIONS

This application claims priority to U.S. provisional application 62/482,969, filed Apr. 7, 2017, which is incorporated herein by reference.

BACKGROUND

Blown film extrusion typically uses an annular cooling device known as an air ring to cool the extruded plastic film as it exits the die. The extrudate is in the form of a thin-wall tube as it goes through the air ring, and is subsequently inflated into a bubble. In order to stabilize the bubble and ensure uniform cooling around the circumference of the bubble, the design of the exit nozzle of the air ring lip is such that the bubble can be "locked" against the inner diameter of the air ring lip forming cone with a constant air gap between the bubble and the forming cone.

In air rings described by the prior art, the "bubble lock" is controlled by adjusting the upper lip assembly up and down which varies the degree of bubble lock by varying the size and location of low pressure regions at and near the air ring lip exit nozzle (often called the Venturi, in some cases actually a result of the Coanda effect). A skilled operator can observe the position of the film bubble relative to the air ring lip and predict the appropriate adjustment of the upper lip assembly in order to achieve the desired constant gap or bubble lock.

However, prior art air rings are configured such that changes in the position of the upper lip assembly not only affect the bubble lock, but also change the cooling air flow rate and create step changes in the air flow path which result in undesirable air flow mixing. This interaction between bubble lock and cooling air flow rate and mixing significantly complicates the adjustment of the lip, often requiring a series of adjustments to correct unintended side-effects of previous adjustments. Examples in the prior art are as follows.

US 2002/0018822 A1, entitled "Air Cooling Ring for Blown Plastics Film," teaches an air cooling ring having a Venturi lip mounted to the annular structure U.S. Pat. No. 5,804,221, entitled "Air Ring for Cooling Blown Plastic Film," teaches an air ring with "an annular body . . . (having) a circumferentially extending air passage through which air can be supplied . . . " and "circumferentially extending series of individually operable actuators . . . operable to vary the Venturi-like effect at its circumferential location and cause the film to become nearer to or further from the body at said location to cause the thickness of the film at said location to decrease or increase."

U.S. Pat. No. 4,826,414, entitled "Air Rings for Production of Blown Plastic Film," teaches a single air cooling ring assembly comprising an upper annular chamber that uses ambient air drawn in by the vacuum effect of the cooling air emitted from the lower annular lips. The upper chamber is adjustable coaxially with the lower annular lips to adjust the flow of air admitted to it.

U.S. Pat. No. 4,373,273, entitled "Air Ring Having a Circular Array of a Large Multiplicity of substantially Parallel Cell-like Passages in the Air Flow Path Leading to the Outlet," teaches an air cooling ring surrounding the bubble immediately above the die head having at least six inlet ports tangentially mounted to an annular plenum. The plenum contains an annular element that redirects the circularly flowing incoming air to a radially inwardly flowing direction perpendicular against the bubble's exterior surface.

U.S. Pat. No. 3,507,006, entitled "Apparatus for Producing Thermoplastic Film," teaches a flexible annular cone that surrounds the bubble and is variable in profile by an annular ring that moves coaxially with the bubble axis via a threaded means to alter said profile thereby causing the bubble and the cooling air stream between the bubble outer surface and the inner surface of said annular cone to change shape.

EP 1719602 B1, entitled "Method and Apparatus for Regulating the Thickness Profile of a Blown Film," teaches two air cooling rings that surround the bubble above the die head. This document shows that the upper air ring can be moved coaxially with the bubble axis of motion.

U.S. Pat. No. 9,248,601, entitled "Method for setting the sizes of blown film tubes as well as a blown film plant comprising a control device for implementing said method", teaches a method by which the film tube size is changed from an initial size of a film tube to a final size of a film tube, and in which method the location of the frost area is optimized during the size change by setting the output of the cooling fan.

SUMMARY OF THE INVENTION

According to an aspect of the invention, an air ring has an adjustable ring element (Venturi Ring or "Vector Ring") in the lip exit nozzle which allows for adjustment of the bubble lock independent of the cooling air flow rate, while maintaining a streamlined flow through the air ring. Decoupling the bubble lock control from the air flow control may make it easier to set-up and optimize the process for different film structures, gauges, or bubble widths, and may result in a larger operating range. Using an adjustable ring instead of adjusting the position of the entire upper lip may reduce or eliminate the need to readjust the blower speed after every lip adjustment. The invention may reduce or eliminate the step changes in the flow path caused by the design of prior art lip adjustments, resulting in a streamlined flow with little to no mixing of the air stream (which may be critical for correcting the film gauge via introduction of subtle variations in air flow using air flow rate control valves).

According to another aspect of the invention, an apparatus includes an upper lip positioned with respect to an air flow passage. The upper lip is to direct air flow from the air flow passage around a bubble of blown film. The apparatus further includes a Venturi ring movably mounted with respect to the upper lip and adjustable in position with respect to the upper lip. The Venturi ring is to adjustably lock the bubble of blown film.

According to another aspect of the invention, an apparatus includes an upper lip positioned with respect to an air flow passage, the upper lip to direct air flow from the air flow passage around a bubble of blown film. The apparatus further includes a Venturi ring positioned with respect to the upper lip, the Venturi ring to lock the bubble of blown film. A position of the Venturi ring is independently adjustable with respect to a position of the upper lip.

An apparatus may further include a secondary collar extending from the Venturi ring to cooperate with the Venturi ring to adjustably lock the bubble of blown film.

The upper lip may define the air flow passage.

The Venturi ring may be distant from the air flow passage and movement of the Venturi ring with respect to the upper lip may not substantially change the air flow passage.

An apparatus may further include a proximity sensor to determine a gap between the blown film and the upper lip.

The proximity sensor may be disposed on the Venturi ring.

The proximity sensor may be movable to determine the gap between the blown film and the lip at different positions around the bubble.

An apparatus may further include a controller connected to the proximity sensor, the controller and the proximity sensor forming a feedback control loop to control a position of the Venturi ring to provide a target gap between the blown film and the lip.

The feedback control loop may reference a predetermined optimal target gap for a type of the blown film.

The controller may include a programmed starting sequence of positioning for the Venturi ring.

An apparatus may further include a plurality of proximity sensors to determine a gap between the blown film and the upper lip.

The position of the Venturi ring may be independently adjustable to substantially maintain a same flow rate of air flow through the air flow passage.

The position of the Venturi ring may be independently adjustable to substantially maintain a same streamlined air flow through the air flow passage.

An apparatus may further include an actuator connected to the Venturi ring to adjust a position of the Venturi ring with respect to a position of the upper lip.

Furthermore, the adjustable ring may be positioned with an actuator that is controlled remotely (e.g., digitally), enabling the recording of the desired position together with a "recipe" that can be recalled later.

Furthermore, decoupling the bubble lock control from the cooling air flow rate with a remotely controlled adjustable ring enables programing of semi-automated or fully automated control algorithms for bubble lock, allowing non-expert operators with less advanced skills to start up or optimize the blown film line, in particular the air ring. The decoupling plus remote ring adjustment bestow the ability to use control algorithms to reduce the complexity and "black art" quality of blown film bubble processing.

DETAILED DESCRIPTION

Figure 1:
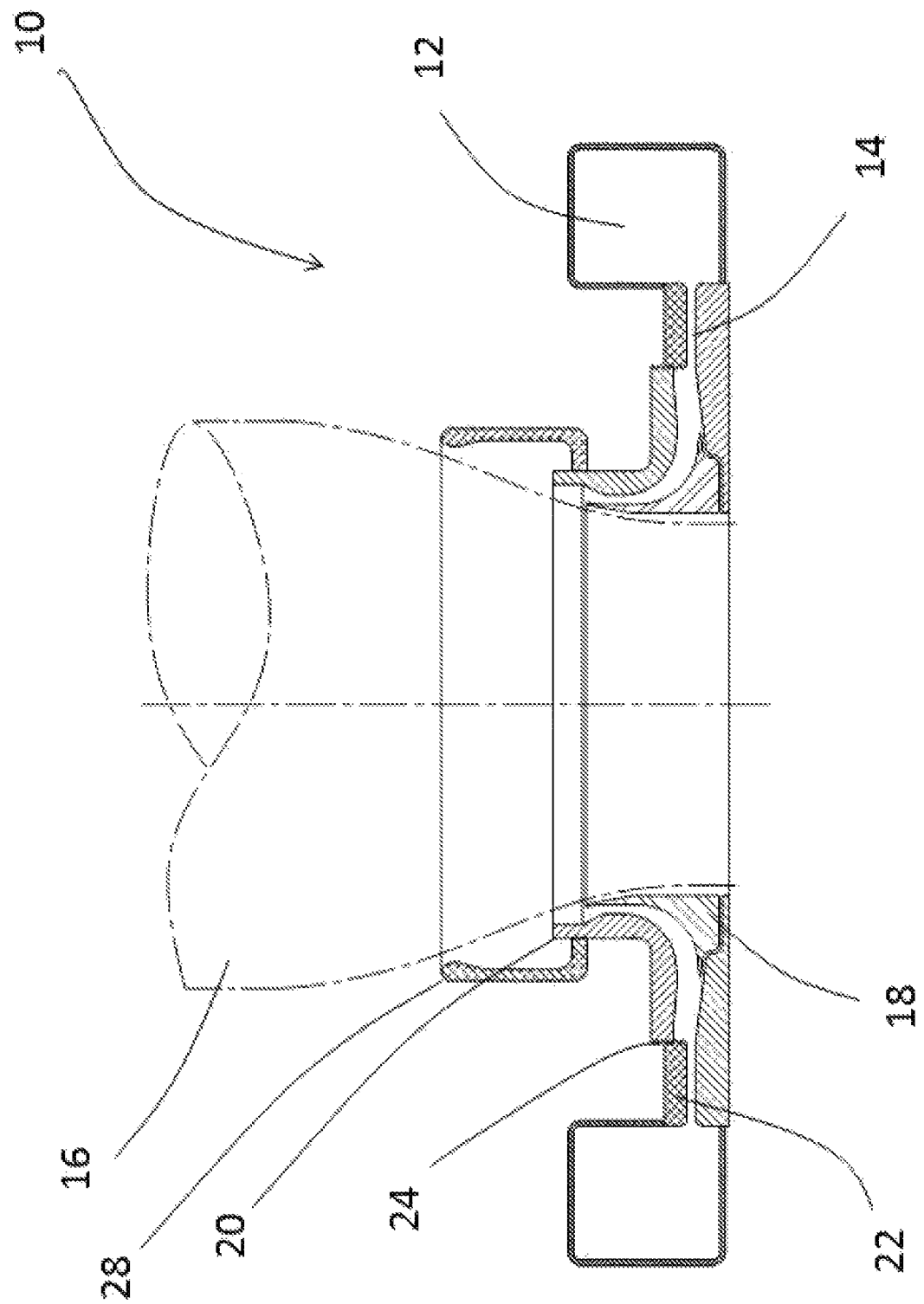
FIG. 1 is a section view of prior art configuration.

FIG. 1 shows a section view of a prior art air ring assembly 10, that includes an annular plenum 12 that supplies cooling air through radial passages 14 that surround the bubble 16. Cooling air is fed through the radial passages 14 and is deflected by forming cone 18 to form an annular flow path surrounding the bubble's outer surface thereby cooling the extrudate. To adjust the bubble lock, an adjustable upper lip 20 and secondary collar 28 assembly is provided that is mounted to an upper flange 22 that extends inwardly from the annular plenum 12. The attachment structure includes a thread 24 which allows vertical adjustment of the adjustable upper lip 20 and secondary collar 28 by rotating the upper lip 20 with respect to the threaded flange 22.

Figure 2:
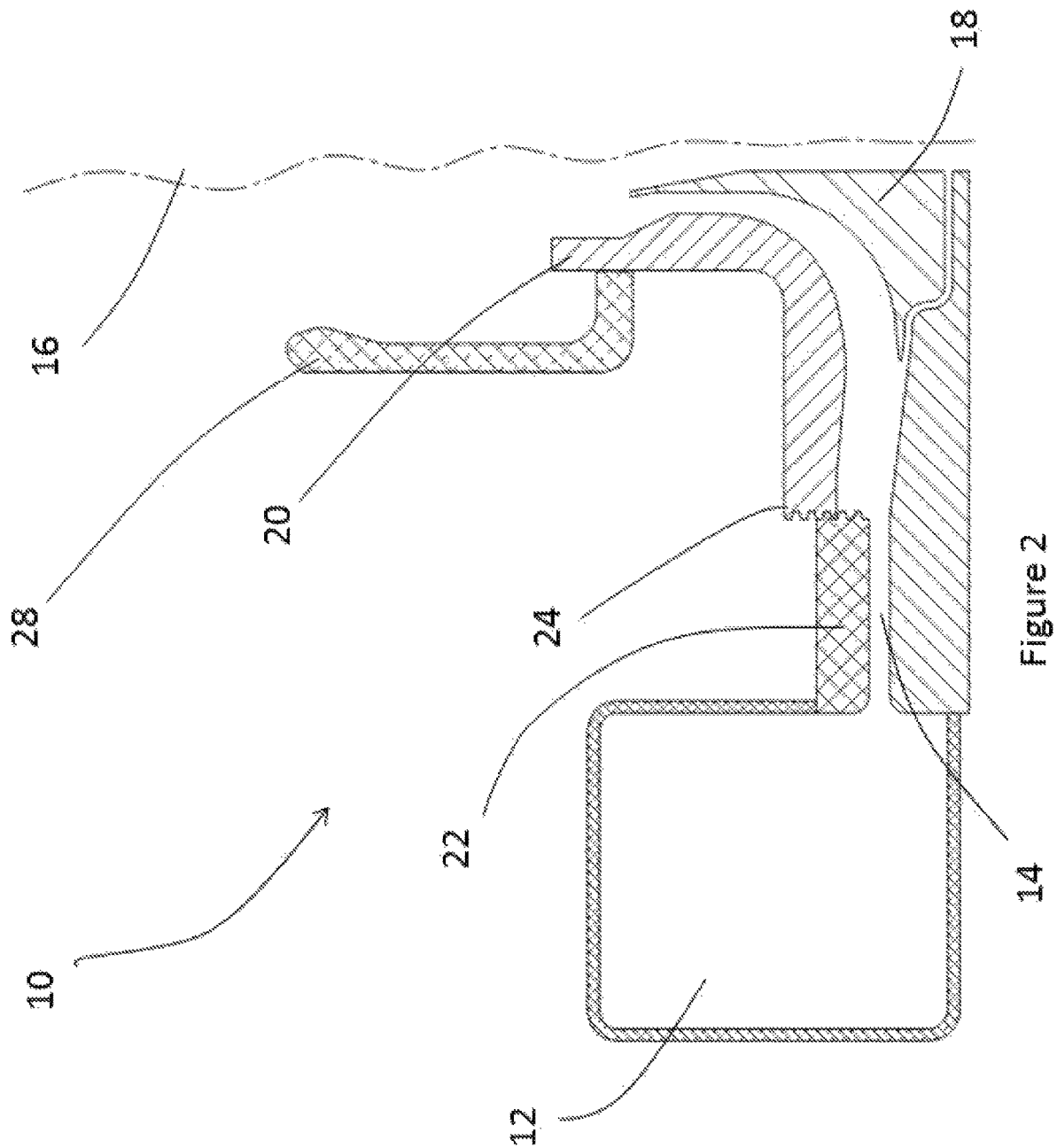
FIG. 2 is a section view of prior art with unlocked bubble detail.

FIG. 2 shows an enlarged section view of the said prior art ring assembly 10 with the bubble 16 in an unlocked position. This state is typical when starting up the film blowing process.

Figure 3:
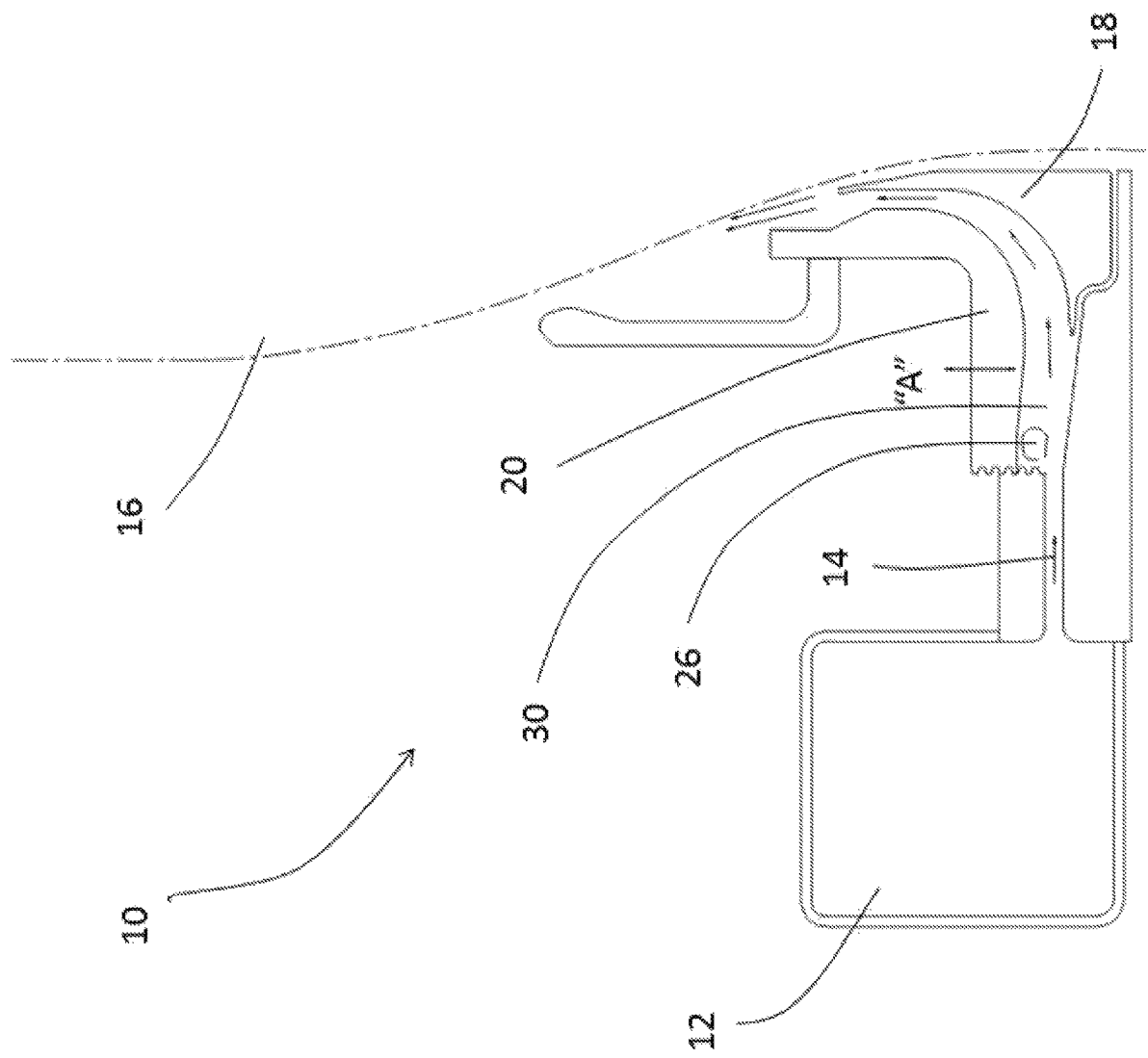
FIG. 3 is a section view of prior art with locked bubble.

FIG. 3 shows a second enlarged view of the said prior art ring assembly 10 with the bubble 16 in a locked position. Arrow "A" indicates the vertical adjustment of the upper lip 20 to alter the bubble lock position. This vertical adjustment also alters the air flow rate through the consequentially enlarged flow passage 30. In order to restore the original air flow rate for the new bubble lock position the blower speed must be adjusted. The same vertical adjustment of the upper lip 20 also creates a re-circulation region 26 of the cooling air flow as it passes through the air ring. This re-circulation region creates a step change in air flow that causes undesirable pressure drop and mixing in the cooling air flow.

Figure 4:
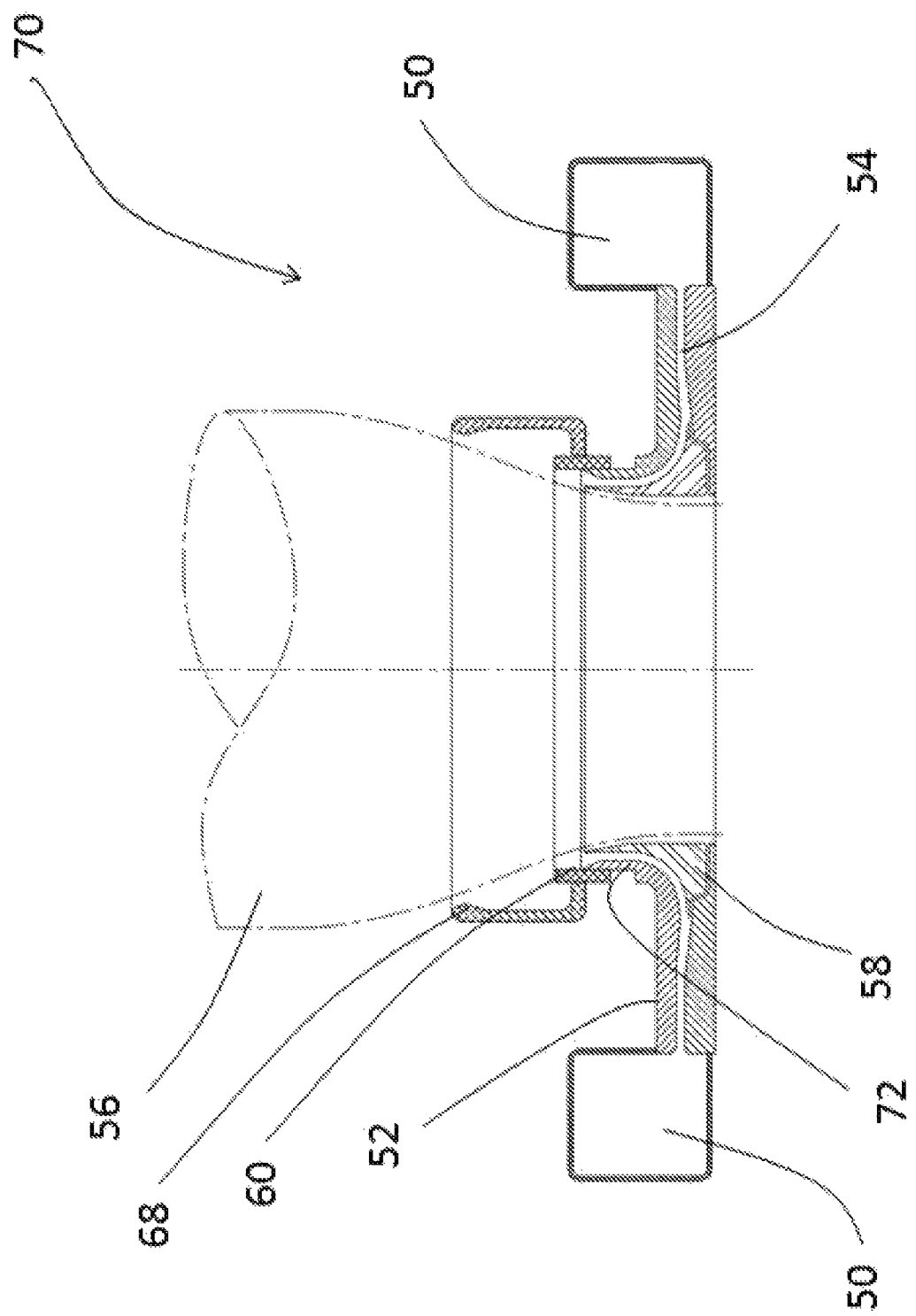
FIG. 4 is a section view of an example inventive apparatus with a locked bubble.

FIG. 4 shows a section view of a blown film extrusion air ring apparatus 70 according to the invention. An annular plenum 50 supplies cooling air through radial passages 54 that surround the bubble 56. Cooling air is fed through the radial passages 54 and is deflected by forming cone 58 to form an annular flow path surrounding the bubble's outer surface thereby cooling the extrudate. An adjustable Venturi ring 60 and secondary collar 68 assembly is provided for bubble lock adjustment. The adjustable Venturi ring 60 and secondary collar 68 assembly is movably mounted on a fixed upper lip 72 which is an annular extension of the upper flange 52 that extends inwardly from the annular plenum 50. Forming cone 58 and upper lip 72 may serve to direct air flow in an air flow passage 74 around a bubble 56 of blown film. The adjustable Venturi ring 60 and secondary collar 68 assembly are moveable by any suitable actuator (e.g., actuator 84 of FIG. 6) which may include a structure such as a ramp, cam, helical thread, or screw. Movement may be actuated manually or via servo motor powered by pneumatic, hydraulic, electrical, or mechanical power.

Figure 5:
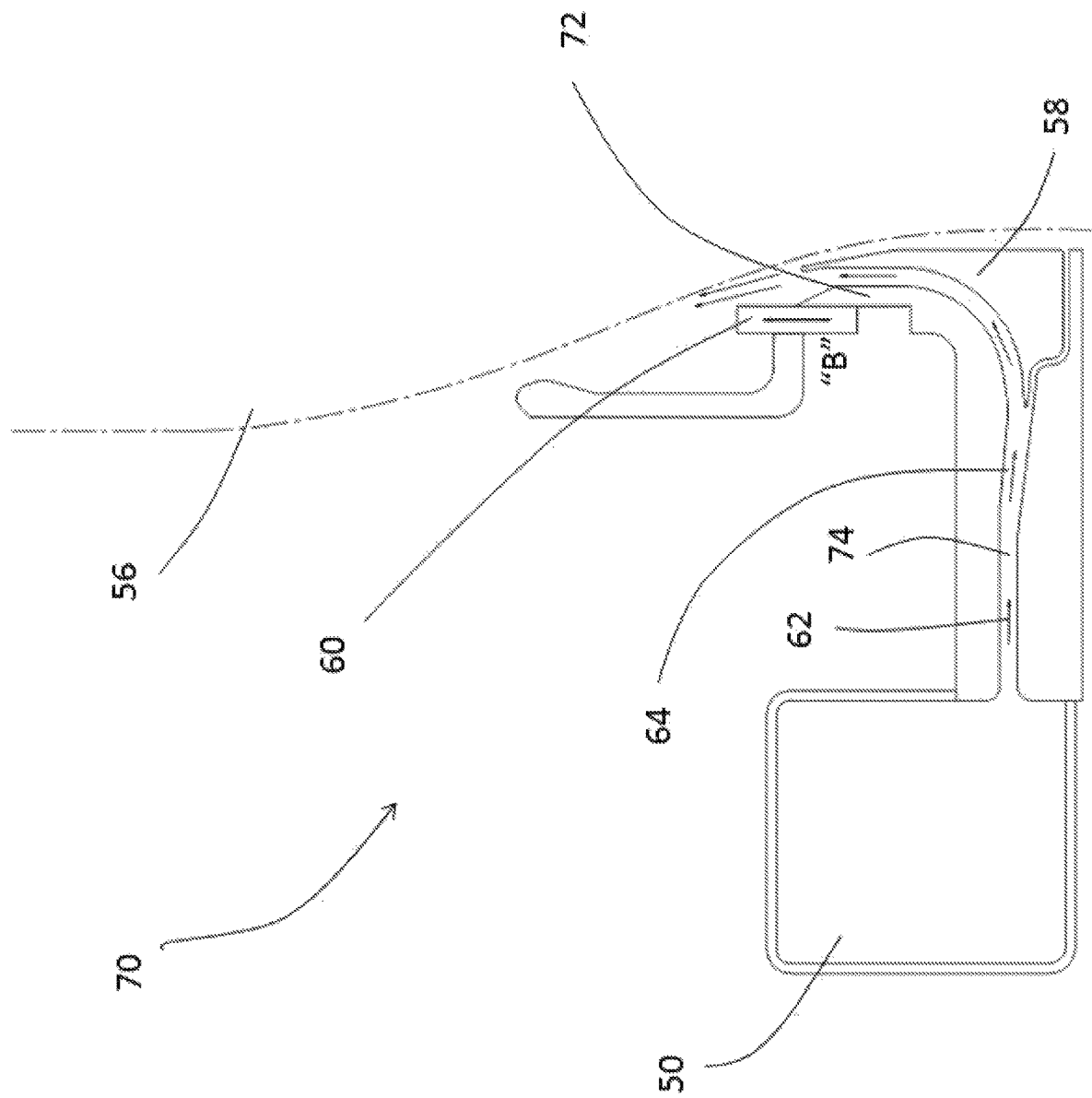
FIG. 5 is a section view of an example inventive apparatus with a locked bubble in detail.

FIG. 5 shows an enlarged section view of the apparatus illustrating the cooling air flow stream 62 passing from the annular plenum 50 in an uninterrupted and streamlined flow 64 to surround and cool the locked bubble 56. Arrow "B" indicates the vertical adjustment of the Venturi ring 60 and secondary collar 68 assembly. This vertical adjustment changes the angle of air flow against the bubble but does not alter the flow rate of the air flow through the flow passage 74, and so no adjustment of the blower speed is required as a consequence of changing the bubble lock position.

By controlling the bubble lock independently from the air flow control, the invention provides a less complicated means to initiate the film blow molding process, set the bubble lock position and optimize the process for different film structures. The invention also results in a larger operating range for the air ring, in terms of available combinations of bubble lock and air flow rate which result in stable blown film bubbles.

The replacement of the prior art adjustable upper lip 20 with the fixed upper lip 72 and adjustable Venturi ring 60 reduces or eliminates step changes in the flow path thereby providing a streamlined flow having little to no mixing of the air stream. This may be a critical requirement for various configurations of air ring that use air flow rate control valves to adjust the blown film gauge.

Figure 6:
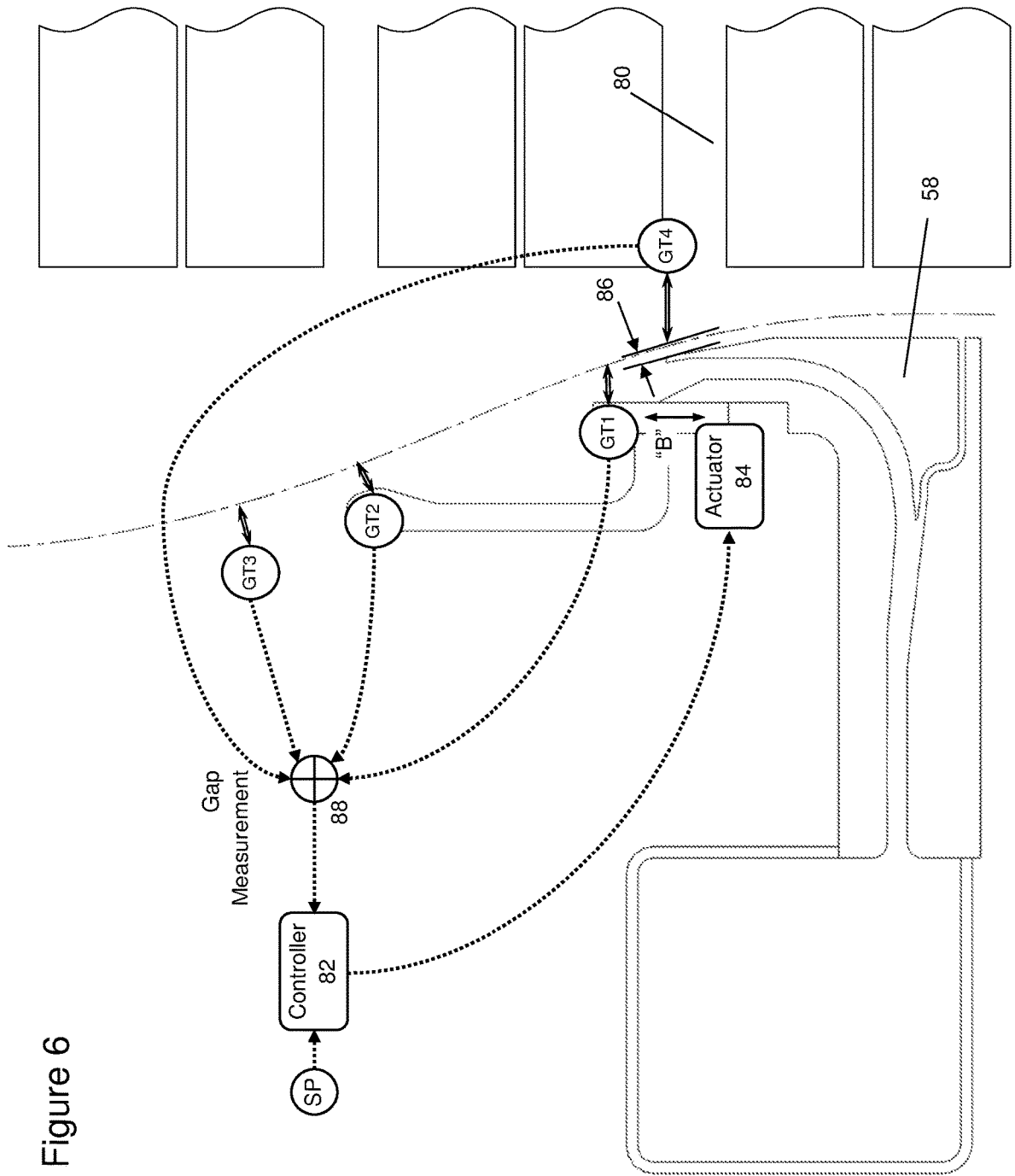
FIG. 6 is a schematic diagram of an example inventive system for automated bubble lock gap control.

FIG. 6 shows a schematic diagram of a feedback control loop that may include a controller 82, an actuator 84, and one or more proximity sensors GT1, GT2, GT3, GT4 located at various positions. The distance of the film relative to a feature of the air ring lip is determined by a proximity sensor GT, and this position is automatically controlled by the controller 82 by way of vertical adjustment "B" of the Venturi ring with the actuator 84. This automated control loop may be configured to function as a bubble lock control system. Thus, wasted time and scrap that may be produced while an operator manually adjusts the air ring can be significantly reduced, and a desired gap or bubble lock is maintained automatically.

When more than one proximity sensor GT1, GT2, GT3, GT4 is used, the sensed signals may be combined in the controller 82 or at a separate node 88.

A proximity sensor to measure the film position may be located at various positions. A proximity sensor GT1 may be located on the Venturi ring. A proximity sensor GT2 may be located on the secondary collar. A proximity sensor GT3 may be mounted independently (e.g., mounted to other structure) upstream of the air ring lip. A proximity sensor GT4 may be located inside the bubble, for instance on an internal bubble control (IBC) device 80. There may be a proximity sensor at any of these locations. There may be a plurality of proximity sensors at any of these locations and such proximity sensors may be spaced around the perimeter for multiple measurements around the entire bubble. A proximity sensor may be a continuous sensor that provides minimum/maximum/average gap measurements around the entire bubble or a substantially large portion thereof. The proximity sensor may be fixed in position, or may be mounted on a moving device such that the sensor can travel around a circumference of the apparatus, scanning the film distance at various continuous positions around the lip or taking measurements at selected positions. In the latter example, the sensor position and measurement signal may be wirelessly transmitted to the controller 82.

A proximity sensor GT1, GT2, GT3, GT4 may include any suitable kind of sensor, such as those based on optical, laser, sonar, capacitive, Doppler, ultrasonic, or other suitable technologies. A sensor which provides an analog output approximately proportional to the distance between the sensor and film surface may be used. A signal from the sensor may be processed digitally to provide a suitable measure of an average distance and/or variability of the distance (movement of the film). The distance to the film from sensor GT1 or sensor GT4 can be used to calculate a gap 86 between the film and the lip of the forming cone 58, which may be considered a primary indicator of bubble lock. Measurements from sensors GT2 or GT3 may be used as additional information about bubble stability relative to air ring lip features (references to gap 86 in this description include these measurements).

A gap 86 measurement determined from a signal transmitted by a proximity sensor GT1, GT2, GT3, GT4 is inputted to the controller 82, which may perform a gap control algorithm. The controller 82 may implement any suitable type of feedback control algorithm, such as PID (proportional-integral-derivative) control, adaptive control, and combinations thereof. The controller 82 outputs a control signal to control the actuator 84 to actuate the Venturi Ring 60 to move up or down, as shown at "B". The controller 82 may be implemented in a stand-alone control device, in a control device which also allows for direct manual control of the air ring, integrated with the blown film line control system, or as part of a distributed control system.

The gap setpoint SP may be inputted to the controller 82. The gap setpoint SP represents a target bubble position relative to the air ring lip at any moment in time. The setpoint may be a predetermined optimal target gap. The target bubble position and corresponding gap setpoint SP may include a gap dimension measured by a sensor, may include an average, minimum, and/or maximum variation in the gap dimension measured at different positions around the bubble, may include a variation in gap measurement over time due to bubble movement (shaking or fluttering), or a combination of such.

The gap setpoint SP may be established in several ways, which represent different control modes or control objectives. These modes or objectives include maintaining a current gap 86; minimizing the gap 86; minimizing bubble movement; seeking a specific value for the gap 86 which may be set by the operator; seeking a specific value for the gap 86 which may be saved as part of a setup recipe for the particular film product being produced; and following a preprogrammed sequence of values for the gap 86 suitable for starting up a blown film line after a planned or unplanned interruption in operation. Multiple objectives, whether simultaneous or sequential, may be programmed in the controller 82.

In some of these modes of control, the controller 82 assists a skilled operator by automatically adjusting the Venturi Ring 60 to achieve or maintain a gap 86 desired by the operator. In other modes, the hands-on knowledge of an operator experienced in setting up the air ring depending on the type of film being produced can be captured and reproduced by less experienced operators.

Figure 7:
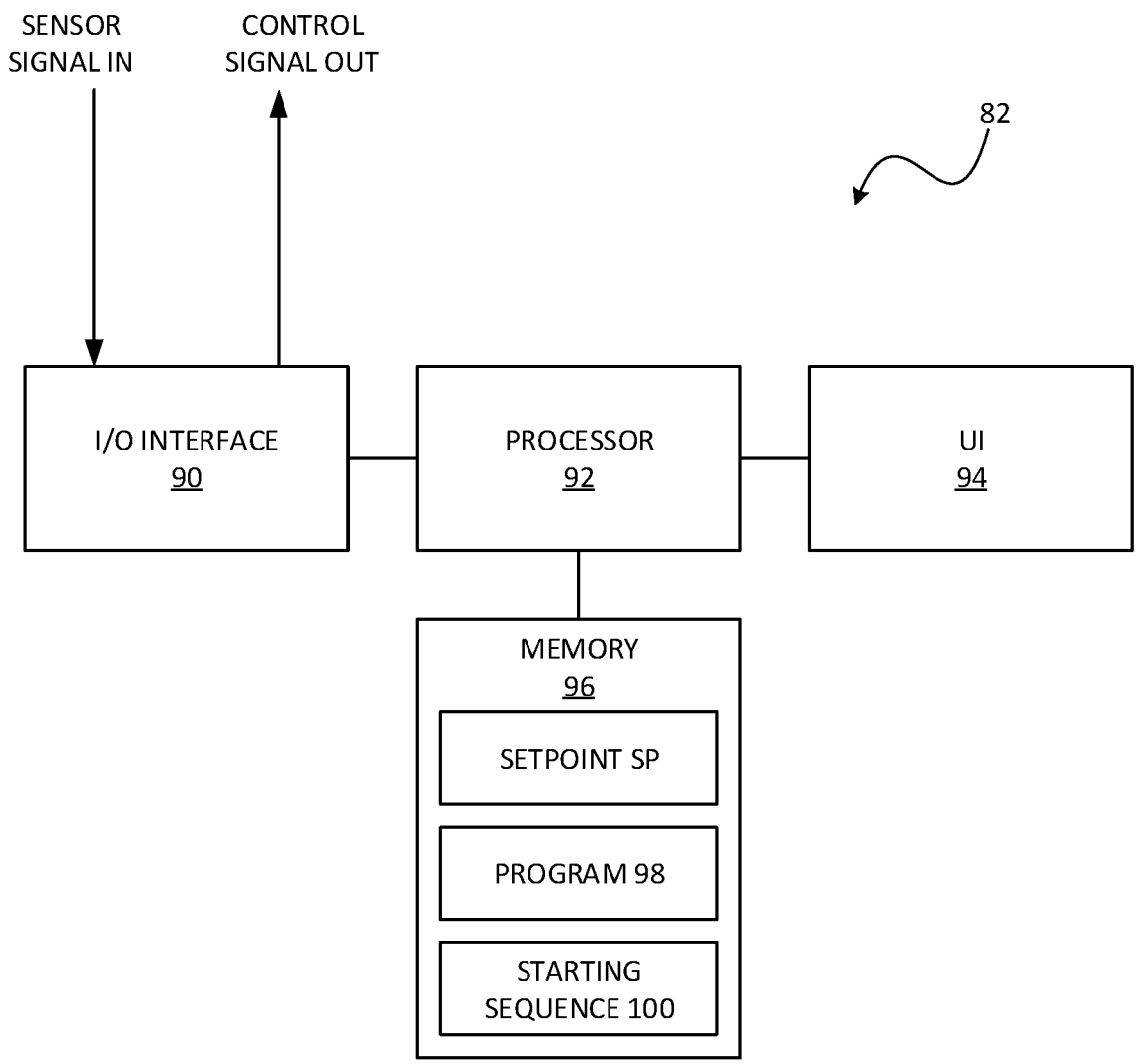
FIG. 7 is a block diagram of an example inventive controller for automated bubble lock gap control.

FIG. 7 shows a block diagram of an example controller 82. The controller 82 may include an input/output (I/O) interface 90, a processor 92, a user interface 94, and memory 96. The controller 82 may be referred to as a computer, a microcontroller, or similar.

The I/O interface 90 may include conductors to receive input signals from proximity sensors and to provide a control signal to an actuator. The I/O interface 90 may include a wireless interface for wireless communications with a proximity sensor or actuator.

The processor 92 executes instructions, which may be stored in memory 96, which may include a non-transitory machine-readable storage medium, such as random-access memory (RAM), read-only memory (ROM), electrically-erasable programmable read-only memory (EEPROM), flash memory, a storage drive, an optical disc, and the like. Such a machine-readable storage medium may be encoded with executable instructions.

The user interface 94 may include an input device, such as a keyboard or touchscreen, a display, or similar. The user interface 94 allows an operator to interact with the controller 82.

The memory 96 may store a setpoint SP and control program 98 to be referenced by the controller 82 in controlling the actuator based on a sensor input signal. The memory 96 may store a starting sequence 100 to be referenced by the controller 82 in controlling the actuator during startup of a blown film apparatus to which the controller 82 is provided. A setpoint SP, control program 98, or starting sequence 100 may be provided, or a common setpoint SP, control program 98, or starting sequence 100 may be parameterized, for various different types of film.

It should be recognized that features and aspects of the various examples provided above can be combined into further examples that also fall within the scope of the present disclosure. In addition, the figures are not to scale and may have size and shape exaggerated for illustrative purposes. Further, in the above the words "and", "or", and "and/or"

should be interpreted to mean any of the items listed in any quantity. In addition, it is recognized that air may have various compositions and the term "air" as used herein is not intended to be limited to a particular composition of gasses.

The invention claimed is:

1. An apparatus comprising:
   a fixed upper lip positioned to define an air flow passage of fixed dimensions, the fixed upper lip to direct air flow from the air flow passage around a bubble of blown film; and
   a Venturi ring movably mounted with respect to the fixed upper lip and adjustable in position with respect to the fixed upper lip, the Venturi ring to adjustably lock the bubble of blown film.

2. The apparatus of claim 1, further comprising a secondary collar extending from the Venturi ring to cooperate with the Venturi ring to adjustably lock the bubble of blown film.

3. The apparatus of claim 1, wherein a volumetric flow rate of air through the air flow passage is dependent only on blower speed.

4. The apparatus of claim 3, wherein the Venturi ring is distant from the air flow passage and movement of the Venturi ring with respect to the fixed upper lip does not substantially change the air flow passage.

5. The apparatus of claim 1, further comprising a proximity sensor to determine a gap between the blown film and the fixed upper lip.

6. The apparatus of claim 5, wherein the proximity sensor is disposed on the Venturi ring.

7. The apparatus of claim 5, wherein the proximity sensor is movable to determine the gap between the blown film and the fixed upper lip at different positions around the bubble.

8. The apparatus of claim 5, further comprising a controller connected to the proximity sensor, the controller and the proximity sensor forming a feedback control loop to control a position of the Venturi ring to provide a target gap between the blown film and the fixed upper lip.

9. The apparatus of claim 8, wherein the feedback control loop is to reference a predetermined optimal target gap for a type of the blown film.

10. The apparatus of claim 8, wherein the controller includes a programmed starting sequence of positioning for the Venturi ring.

11. The apparatus of claim 1, further comprising a plurality of proximity sensors to determine a gap between the blown film and the fixed upper lip.

12. An apparatus comprising:
    a fixed upper lip positioned with respect to an air flow passage, the fixed upper lip to direct air flow from the air flow passage around a bubble of blown film; and
    a Venturi ring positioned with respect to the fixed upper lip, the Venturi ring positioned at an outlet of the air flow passage, the Venturi ring to lock the bubble of blown film;
    wherein a position of the Venturi ring is independently adjustable with respect to a position of the fixed upper lip to change an angle of air flow against the bubble without altering a flow rate of air flow through the flow passage.

13. The apparatus of claim 12, wherein the position of the Venturi ring is independently adjustable to substantially maintain a same flow rate of air flow through the air flow passage.

14. The apparatus of claim 12, wherein the position of the Venturi ring is independently adjustable to substantially maintain a same streamlined air flow through the air flow passage.

15. The apparatus of claim 12, further comprising a proximity sensor to determine a gap between the blown film and the fixed upper lip.

16. The apparatus of claim 15, wherein the proximity sensor is movable to determine the gap between the blown film and the fixed upper lip at different positions around the bubble.

17. The apparatus of claim 15, further comprising a controller connected to the proximity sensor, the controller and the proximity sensor forming a feedback control loop to control a position of the Venturi ring to provide a target gap between the blown film and the fixed upper lip.

18. The apparatus of claim 17, wherein the feedback control loop is to reference a predetermined optimal target gap for a type of the blown film.

19. The apparatus of claim 17, wherein the controller includes a programmed starting sequence of positioning for the Venturi ring.

20. The apparatus of claim 12, further comprising an actuator connected to the Venturi ring to adjust a position of the Venturi ring with respect to a position of the fixed upper lip.

* * * * *